(12) United States Patent
Serrano Gotarredona et al.

(10) Patent No.: US 9,544,507 B2
(45) Date of Patent: Jan. 10, 2017

(54) METHOD AND DEVICE FOR DETECTING THE TEMPORAL VARIATION OF THE LIGHT INTENSITY IN A MATRIX OF PHOTOSENSORS

(71) Applicant: CONSEJO SUPERIOR DE INVESTIGACIONES CIENTÍFICAS (CSIC), Madrid (ES)

(72) Inventors: Teresa Serrano Gotarredona, Seville (ES); Bernabé Linares Barranco, Seville (ES)

(73) Assignee: CONSEJO SUPERIOR DE INVESTIGACIONES CIENTIFICAS (CSIC), Madrid (ES)

( * ) Notice: Subject to any disclaimer, the term of this patent is extended or adjusted under 35 U.S.C. 154(b) by 0 days.

(21) Appl. No.: 14/649,224

(22) PCT Filed: Nov. 12, 2013

(86) PCT No.: PCT/ES2013/070787
§ 371 (c)(1),
(2) Date: Jun. 3, 2015

(87) PCT Pub. No.: WO2014/091040
PCT Pub. Date: Jun. 19, 2014

(65) Prior Publication Data
US 2015/0319369 A1 Nov. 5, 2015

(30) Foreign Application Priority Data
Dec. 11, 2012 (ES) .................................. 201231921

(51) Int. Cl.
*H04N 5/243* (2006.01)
*H04N 5/3745* (2011.01)
*H04N 5/335* (2011.01)

(52) U.S. Cl.
CPC ............ *H04N 5/243* (2013.01); *H04N 5/3355* (2013.01); *H04N 5/3745* (2013.01); *H04N 5/37455* (2013.01); *H04N 5/37457* (2013.01)

(58) Field of Classification Search
CPC H04N 5/243; H04N 5/37457; H04N 5/37455; H04N 5/3355; H04N 5/3745
(Continued)

(56) References Cited

U.S. PATENT DOCUMENTS 5,606,282 A * 2/1997 Yoshida .................. H03F 3/082
250/214 A
8,674,770 B2 * 3/2014 Takiba .................... H03F 3/082
330/308

(Continued)

FOREIGN PATENT DOCUMENTS

WO 2006/128315 12/2006
WO 2012/160230 11/2012

OTHER PUBLICATIONS

International Search Report issued Jan. 24, 2014 in International (PCT) Application No. PCT/ES2013/070787.

*Primary Examiner* — Seung C Sohn
(74) *Attorney, Agent, or Firm* — Wenderoth, Lind & Ponack, L.L.P.

(57) ABSTRACT

The invention relates to a method and a device for detecting the temporal variation of the light intensity in a matrix of photosensors, comprising a matrix of pixels, a block for the automatic adjustment of the amplification of the photocurrent, and an arbitrating and event-encoding block. Each pixel comprises a photosensor that generates a photocurrent, an adjustable gain current mirror connected to the outlet of the photosensor, a transimpedance amplifier arranged at the outlet of the current mirror, optionally at least one amplification circuit arranged at the outlet of the transimpedance amplifier, and capacitors and detectors of thresholds for (Continued)

determining whether the output voltage exceeds a higher threshold or drops below a lower threshold in order to generate an event in the pixel.

19 Claims, 8 Drawing Sheets

(58) Field of Classification Search
USPC .................................................... 250/208.1
See application file for complete search history.

(56) References Cited

U.S. PATENT DOCUMENTS

2004/0065876 A1* 4/2004 Delbruck ................ H03F 3/082
 257/40
2009/0189057 A1* 7/2009 Asaba ............... H01L 27/14609
 250/208.1

\* cited by examiner

STATE OF THE ART

STATE OF THE ART

METHOD AND DEVICE FOR DETECTING THE TEMPORAL VARIATION OF THE LIGHT INTENSITY IN A MATRIX OF PHOTOSENSORS

OBJECT OF THE INVENTION

The present invention describes a method and a device for detecting the temporal variation of the light intensity in a matrix of photosensors which solves the problems associated with the inventions of the state of the art by a method and device which replaces the stages that are previous to the stage of switched capacitors for a sequence of transimpedance and transconductance amplifier stages and with current mirrors, the first of which is of variable gain, whose gain is adjusted based on the average ambient light calculated by an automatic gain control which is common for all pixels. This allows the reduction of the pixel area and consumption, while contrast sensitivities of about 1% are achieved.

The present invention falls within the field of artificial vision sensors, particularly in the concept of so-called temporal difference sensors or "Dynamic Vision Sensors" (DVS).

BACKGROUND OF THE INVENTION

DVS sensors are cameras in which each pixel generates an event every time the light striking it changes in a fixed ratio since said pixel generated the previous event. If light increases, the event will be positive and it will be negative if the light fades. This way, the sensor generates a flow of events over time, where each event is defined by the three components (x, y, s), wherein (x, y) are pixel coordinates in the matrix and 's' is the event sign. This flow of events represents the changing visual scene that is captured by the sensor. This sensor concept was originally introduced by Kramer ((J. Kramer, "An Integrated Optical Transient Sensor," IEEE Transactions on Circuits and Systems, Part-II: Analog and Digital Signal Processing, vol. 49, No. 9, pp. 612-628, September 2002) and (J. Kramer, "An on/off transient imager with event-driven, asynchronous read-out," IEEE Int. Symp. On Circuits and Systems, ISCAS 2002, vol. II, pp. 165-168, 2002)), but its embodiment posed a severe mismatch in pixel performance, which limited the maximum temporal contrast sensitivity that could reach values of about 30% (P. Lichtsteiner, et al "Improved ON/OFF Temporally Differentiating Address-Event Imager," Proceedings of the 2004 IIth IEEE International Conference on Electronics, Circuits and Systems, 2004. ICECS 2004, pp. 211-214). In order to improve this state of the art, Lichtsteiner subsequently proposed an improved sensor by introducing a self-timing switched capacitor stage with two capacitors (U.S. Pat. No. 5,168,461) providing a lower mismatch in the performance from pixel to pixel, thus making possible to achieve sensibilities to the temporal contrast in the range of 15% ((P. Lichtsteiner, et al, "A 128×128 120 dB 15 µs Latency Asynchronous Temporal Contrast Vision Sensor," IEEE J. Solid-State Circ., vol. 43, No. 2, pp. 566-576, February 2008) and (U.S. Pat. No. 7,728,269 B2)).

However, the switched capacitor stage required that the two capacitors have a very disparate value, which in one embodiment of integrated circuit results in the requirement of a considerable area within each pixel area. In the sensor manufactured by Lichtsteiner ((P. Lichtsteiner, et al, "A 128×128 120 dB 15 µs Latency Asynchronous Temporal Contrast Vision Sensor," IEEE J. Solid-State Circ., vol. 43, No. 2, pp. 566-576, February 2008) and (U.S. Pat. No. 7,728,269 B2)) these capacitors took approximately two thirds of the total area of the pixel. Therefore, as pixels are large, the chip occupies a large area and is expensive. In order to improve this new state of the art, Leñero (J. A. Leñero-Bardallo, et al, "A 3.6 us Asynchronous Frame-Free Event-Driven Dynamic-Vision-Sensor," IEEE J. of Solid-State Circuits, vol. 46, No. 6, pp. 1443-1455, June 2011) proposed reducing the disparity between the value of the capacitors while introducing a voltage amplifier stage of very small area before that of the switched capacitators, thus achieving both the reduction of the area of the pixel and slightly improving temporal contrast sensitivity up to values of about 10%. However, this amplifier stage had a high consumption and slightly deteriorated the mismatch of pixel performance.

To explain the improvement achieved by the present invention over the state of the art, Lichtsteiner's sensor (U.S. Pat. No. 7,728,269 B2) has been taken as reference, whose pixel simplified diagram is shown in FIG. 1. The light sensed by photodiode D is transformed into photocurrent $I_{ph}$. The transistors T1 to T4 logarithmically transforms $I_{ph}$ into the voltage $V_{P1}=V_{offset}+V_0 \log(I_{ph})$ in the node P1. The photocurrent $I_{ph}$, which flows through the transistor T4 and exits from the drain node P0, which is shared by all pixels of the matrix, is added in the current adder block ΣI, which also ads the photocurrents from all pixels in the matrix. This sum is subsequently used to automatically adjust the gate of the transistor T3 in the pixels to minimize consumption of the amplifier T1-T3 to adapt it to ambient light (US 2004/065876). The transistors T5a and T5b copy $V_{P1}$ to node P2. In Leñero's improvement, these two transistors are replaced by a voltage amplifier stage with gain $A_v$, so that the voltage at P2 would be $V_{P2}=A_v(V_{offset}+V_0 \log(I_{ph}))$, wherein $A_v=1$ for the embodiment according to Lichtsteiner and $A_v>1$ for the embodiment according to Leñero. The switched capacitor circuit comprising the capacitors C1 and C2 and the transistors T6 to T8, copy the voltage variation at P3 to P2 from a previous reset time $t_1$ multiplied by the capacitive gain $A_c=C2/C1$. Thus, $V_{P3}(t)=A_c(V_{P2}(t)-V_{P2}(t_1))=A_cA_vV_0 \log(I_{ph}(t)/I_{ph}(t_1))$. The transistors T9 to T11 detect whether $V_{P3}(t)$ exceeds a specific positive threshold $V_{R+}$ and if so, they generate a positive event (ON). The transistors T12 to T14 detect whether $V_{P3}(t)$ falls below a negative threshold $V_{R-}$ and if so, they generate a negative event (OFF). Every time the pixel generates an event, a reset of capacitor C1 occurs by means of the reset transistor T7. This way, the pixel immediately generates a positive event $t_2$ if $V_{P3}(t_2) \geq V_{R+}=A_cA_vV_0 \log(I_{ph}(t_2)/I_{ph}(t_1))$, and a negative event if $V_{P3}(t_2) \leq V_{R-}=A_cA_vV_0 \log(I_{ph}(t_2)/I_{ph}(t_1))$. This can also be expressed as $\Delta I/I = \exp((V_{R+/-})/(A_cA_vV_0))-1=\theta_{+/-}$. Where the parameter $\theta_{+/-}$ represents the sensitivity to the positive or negative contrast. The minimum value that can be adjusted for this contrast sensitivity is given by the dispersion from pixel to pixel of the parameters $V_{R+/-}$, $A_c$, $A_v$ and $V_0$. The parameter $V_0$ is usually a function of physical constants and does not undergo dispersion from pixel to pixel in the same chip. The dispersion of the parameters $V_{R+/-}$ is given by the dispersion in the performance of the amplifiers T6 and T8 and the voltage comparators (transistors T9 to T11 and T12 to T14) and is normally high because the amplifiers T6 and T8 and the comparators are made small to reduce the total pixel area. The impact of high mismatch of the amplifier and comparators is reduced by increasing the product of the denominator $A_cA_v$. In Lichtsteiner's state of the art $A_v=1$, whereby it was mandatory to make $A_c$ as big as possible. For example, in the Lichtsteiner's embodiment ((P. Lichtsteiner, et al, "A 128×128 120 dB 15 µs Latency Asynchronous Temporal Contrast Vision Sensor," *IEEE J. Solid-State Circ.*, vol. 43, No. 2, pp. 566-576, February 2008) a value of 20 was given. The parameter A, also undergoes dispersion from pixel to pixel, but it is reduced because in integrated circuits the relationship between capacitances is subject to low dispersion (typically below 1%). In Letiero's embodiment, the parameter $A_v$ also introduces dispersion. However, the parameter $A_c$ could be reduced to 5 while $A_v$ was set at about 25. In this way, the product was 125, which improved overall contrast sensitivity in spite of slightly increasing the dispersion. However, the additional amplifier stage greatly increased the pixel consumption (above a factor of 10).

Therefore, the state of the art poses the problem that contrast sensitivity cannot be improved without increasing the pixel area or without increasing the power consumption. In order to solve the problems associated with the state of the art, the present invention uses transimpedance amplifiers by connecting MOS transistors, polarised in weak inversion and having a diode configuration, which are connected in series (ES 201130862).

DESCRIPTION OF THE INVENTION

In the present invention, a method and a device, which solve the problem posed by the state of the art, are provided. To this end, the present invention proposes to achieve a previous amplification $A_v$, which does not undergo dispersion from pixel to pixel of the sensor matrix, which employs transimpedance amplifiers by connecting MOS transistors polarised in weak inversion and having a diode configuration, which are connected in series. However, when several MOS transistors polarised in weak inversion and having a diode configuration are connected in series, it is necessary to ensure that the operating current is not excessively low so that the circuit operation is not slow, due to the stray capacitance introduced by the MOS transistors. For example, for typical sizes to be employed in the pixels of a dynamic vision sensor (DVS), it would be necessary to ensure that the operating current is from about 1 nA to about 100 nA. This would ensure a response speed below the millisecond for each pixel, which allows the use of the DVS in high speed applications, where it is competitive over conventional photogram-based cameras. Moreover, such current should not be too high, since that would make the MOSFET transistors be no longer polarized in weak inversion. To ensure that in series connected MOS transistors, polarised in weak inversion and having a diode configuration, operate at high currents (from about 1 nA to about 100 nA), they cannot be made to directly operate with the photocurrents which generate the photodiodes, which typically vary as a function of the ambient light from 1 femtoampere to 1 nanoampere. Therefore, the present invention includes, in each pixel, a stage of current amplification with a gain that adapts to the average light sensed by all pixels $<I_{ph}>$. Thus the transimpedance amplifier operating current based on the in-series connection of MOS transistors, polarised in weak inversion and having a diode configuration, is maintained at an average current level $<A_vI_{ph}>$ for all the pixels that is constant and equal to a pre-set reference current $I_{b1}$, which is typically between 1 nA and 100 nA. To do this, the present invention comprises a mechanism for automatic control of the gain, which, on one hand, senses in every time the average incident light in the matrix of pixels $<I_{ph}>$ and, on the other hand, adjusts the gain of the current amplifier stage for all the pixels so that the average $<A_vI_{ph}>$ is equal to a constant reference $I_{b1}$ set by the user, typically between 1 nA to 100 nA.

Thus, a first object of the present invention is an integrated circuit device for detecting the temporal variation of the light intensity in a matrix of photosensors comprising, at least, one matrix of pixels, a block for the automatic adjustment of the amplification of the photocurrent that is generated at every pixel, and an arbitrating and event-encoding block, which is connected to the output of the matrix of pixels. In turn, each matrix of pixels comprises, at least:

a) a photosensor that generates a photocurrent, which is proportional to the amount of light striking on its surface, said photocurrent will be comprised, in a particular mode for carrying out the invention, between 1 femtampere and 1 nanoampere;

b) an adjustable gain current mirror, which has an input branch and two output branches, the first of such outputs having adjustable current gain and the second output having fixed current gain. The mirror introduces a current gain, which is fixed by the block for the automatic adjustment, and copies the photocurrent to the current mirror output branch, by amplifying the current, in a more particular mode for carrying out the invention, to a value ranging from 1 nA to 100 nA. Furthermore, it minimizes the voltage excursions in a node of the photosensor, avoiding the charging and discharging of the stray capacitance in said node. The current gain of said mirror is adjusted by the block for the automatic adjustment of the amplification of the current. In this way, the output branch with fixed gain copies the input photocurrent to a collector transistor connected in diode configuration and whose nodes are connected to the collector transistors of the rest of pixels from the matrix and the adjustable current gain branch copies the input current to a transimpedance amplifier.

d) the transimpedance amplifier arranged at the output of the adjustable gain branch of the adjustable gain current mirror, wherein the amplifier consists of at least two in-series MOS transistors polarised in weak inversion, each MOS transistor being in diode configuration, for the conversion of the photocurrent into a logarithmic voltage. The amount of in-series transistors will depend on the needs of each particular case;

e) a circuit of switched capacitors comprising a first capacitor connected to the output of the transimpedance amplifier, a second voltage amplifier connected to the first capacitor and a second capacitor connected in series with the first capacitor and feedback connected to the second voltage amplifier, the second capacitor being connected in parallel to a MOS transistor which acts as a reset key; and g) a first threshold detector to determine if the voltage exceeds a higher threshold and a second threshold detector to determine if the voltage drops below a lower threshold, both detectors being connected to the output of the second voltage amplifier. Said higher and lower thresholds will be previously set by a user.

In a particular mode for carrying out the invention, the photosensor has been intended to be a photodiode, although any other phototransductor device, which provides a photocurrent from the light striking it could be used.

In another particular embodiment of the invention, each pixel comprises, at least, one additional amplification block arranged between the output of the first transimpedance amplifier and the input of the switched capacitor circuit.

These blocks will be connected in cascade or iteration the one to the other. In addition, the input of the additional first amplification block is connected to the output of the transimpedance amplifier of the pixel and the output of the additional last amplification block is connected to the first capacitor of the switched capacitor circuit. Each of the blocks, in turn, comprises, at least, a transconductance amplifier, a fixed gain current mirror connected to the output of the transconductance amplifier and an additional transimpedance amplifier with, at least, two in-series MOS transistors polarised in weak inversion, each MOS transistor being in diode configuration. This additional transimpedance amplifier will be connected to the output of the fixed gain current mirror. If there is only one additional amplification block, it is understood that it is the input of such block which is connected to the output of the first transimpedance amplifier of the pixel and that it will be the output of this block which is connected to the input of the first condenser of the switched capacitor circuit.

In another particular embodiment of the invention, when it has been envisaged the inclusion of more than one additional amplification block, such blocks are connected in cascade or iteration the one to the other. The connection of second and successive blocks with the immediately previous block is performed by connecting the gate terminal of the transconductance amplifier of each block with the output of the transimpedance amplifier of the previous block. In this way, an increase of the amplification provided to the logarithmic voltage of the adjustable gain current mirror is achieved.

Note that in the particular embodiments of the invention wherein additional amplification blocks are used, the switched capacitor circuit is not directly connected to the output of the first transimpedance amplifier of the pixel, but to the output of the transimpedance amplifier of the last block, which is connected in cascade or iteration.

In another particular embodiment of the invention, the adjustable gain current mirror is formed by at least one MOS input transistor, one MOS output transistor and a voltage inverter amplifier. Said MOS input transistor is designed, in another more particular embodiment of the invention, so that its gate terminal is connected to a voltage $V_G$ previously set by a user from outside the device, which will be common to all the pixels of the matrix, its drain terminal is connected to the photodiode and its source terminal is connected to the output of the voltage inverter amplifier. In another particular embodiment of the invention, it has also been provided that the MOS output transistor of the adjustable gain current mirror is designed so that its source terminal is connected to the source terminal of the MOS input transistor, its terminal gate is connected to a voltage $V_{GA}$, which is set by the automatic gain control circuit, and its drain terminal acts as an output of the adjustable gain current mirror and is connected to the input of the first transimpedance amplifier.

In another particular embodiment of the invention, for each pixel whose first threshold detector determines that the voltage exceeds the higher threshold or the second threshold detector which determines that the voltage has dropped below a lower threshold, the arbitrating and event-encoding block comprises a processor for determining the coordinates x and y corresponding to the position of the pixel in the matrix and to generate an event with sign s, the sign s being determined by the first and second threshold detectors and generating a word which binary encodes the set formed by the coordinates (x, y) and the sign s. Specifically, the first detector will generate a signal of positive sign when the higher threshold is exceeded and the second detector will generate a signal of negative sign when it drops below the lower threshold.

In another particular embodiment of the invention, the block for the automatic adjustment of the amplification of the photocurrent is an automatic gain control circuit comprising, at least:
a) a replication of the collector transistor of one of the pixels,
b) a replication of the adjustable gain current mirror of the pixel in which its MOS input transistor has its gate connected to the voltage $V_G$ and its output is connected to a first current reference $I_{b1}$;
c) a first differential voltage amplifier whose negative input is connected to the output of the mirror and to the current reference $I_{b1}$, whose positive input is connected to a voltage reference, and whose output is connected to the gate of the MOS output transistor, thus generating the voltage $V_{GA}$;
d) a second differential voltage amplifier connected in a unity gain configuration, which copies the voltage $V_{GA}'$ to the gate terminal $V_{GA}$ of the output transistors of the adjustable gain current mirrors of the pixels.

In another particular embodiment of the invention, in the block for the automatic adjustment of the amplification of the photocurrent, provided that the pixels comprise, at least, one additional amplification block, a second MOS output transistor of the adjustable gain current mirror sharing the gate and source terminals with the first MOS output transistor, and whose drain terminal constitutes a second mirror output, is arranged. To this output, a stage for the adjustment of the additional amplification blocks in the pixels is connected. This additional adjustment stage for adjusting the additional amplification blocks of the pixels comprises: a transimpedance amplifier stage, which is a replication of the first transimpedance amplifier in the pixels, a transconductance amplifier, which is a replication of the first transconductance amplifier in the pixels, a differential voltage amplifier and a current reference $I_{b2}$. These elements of the stage for the adjustment of the additional amplification blocks in the pixels are connected as follows: the input node of the additional adjustment stage is the transimpedance amplifier node, which generates a logarithmic voltage therein; to this node, the transconductance amplifier gate is also connected, whose source shares the node $V_{Q1}$ with the sources of the transconductance amplifiers of all the pixels, and whose drain is connected to a current reference $I_{b2}$; this drain is connected to the negative input of the differential voltage amplifier, whose positive input is connected to a reference voltage and whose output is connected to the node $V_{Q1}$.

In another particular embodiment of the invention, if pixels have a second additional amplification block to increase the logarithmic voltage amplification, the block for the automatic adjustment of the amplification of the photocurrent contains a second additional adjustment stage for adjusting said second additional amplification block in the pixels, to whose input node the reference current $I_{b2}$ would be connected.

In another particular embodiment of the invention, if the pixels have more additional amplification blocks connected in cascade or iteration, more additional adjusting stages are added in equal number in cascade or iteration, in the block for the automatic adjustment of the amplification of the photocurrent, for the adjustment of such "additional amplification blocks" in the pixels.

In another particular embodiment of the invention, the switched capacitor stage is connected to the output of the last additional transimpedance amplifier present in the pixels.

In another particular embodiment of the invention, a switched capacitor stage is connected to the output of said first capacitor, where said stage consists of a voltage amplifier, a second feedback connected capacitor and a MOS transistor acting as a reset key and connected in parallel to the second capacitor to add an additional voltage amplification and calculate a difference in voltage between two consecutive reset times.

A second object of the present invention is a method for detecting temporal variation of the light intensity in a matrix of photosensors, which makes use of the device described above. For carrying out said method, at least the following stages are performed in each pixel of the matrix:

1) transforming the light striking the pixel into a current $I_{ph}$ by the photodiode;
2) amplifying the current $I_{ph}$ to a $A_I I_{ph}$ value by means of the adjustable gain current mirror;
3) adapting the value $A_I$ so that the average of $A_I I_{ph}$ remains constant against the temporal variations of the average brightness of all the pixels by means of the block for the automatic amplification of the photocurrent;
4) converting the adapted current $A_I I_{ph}$ to a logarithmic voltage by means of the transimpedance amplifier that comprises, at least, two MOS transistors, polarised in weak inversion and connected in series, each of them being connected in diode configuration;
5) determining, in the switched capacitor circuit, a voltage difference $\Delta V=V(t_2)-V(t_1)$ between two consecutive times $t_1$ and $t_2$, caused by a temporal variation of the light intensity and comparing the voltage difference with a positive fixed reference value $V_{R+}$ and a fixed negative reference value $V_{R-}$, wherein $V_{R+}$ and $V_{R-}$ are the same for all the pixels of the matrix;
6) generating the digital signal s, which is sent to the arbitrating and event-encoding block, the signal being selected from:
   a positive event every time the first threshold detector determines that the voltage exceeds the higher threshold, generated in the first threshold detector; and,
   a negative event every time the second threshold detector determines that voltage falls below the lower threshold, generated in the second threshold detector;
and in the arbitrating and event-encoding block connected to the output of the pixel matrix the following subsequent stages are carried out:
   identifying the spatial coordinates (x, y) of the pixels of the matrix which have generated a digital signal.
   sending to an element external to the device a digital word containing the spatial coordinates (x, y) and the signal s; and,
   generating a flow of words (x, y, s) representing the temporal variation of the light intensity in the photosensor matrix.

In another particular mode for carrying out the invention, a difference in the voltage is calculated between two consecutive reset times by means of the switched capacitor stage.

In another particular mode for carrying out the invention, after converting the $A_I I_{ph}$ current previously adapted to a voltage and as a stage previous to the determining of a voltage difference $\Delta V=V(t_2)-V(t_1)$ in the switched capacitor circuit, the method, object of the present invention, provides the amplification of the voltage obtained from the conversion of the $A_I I_{ph}$ current by at least one additional amplification block.

EXAMPLES

Next, an illustrative and non-limiting description is made of several examples of particular embodiments of the invention by making reference to the numbering adopted in the figures.

Figure 2:
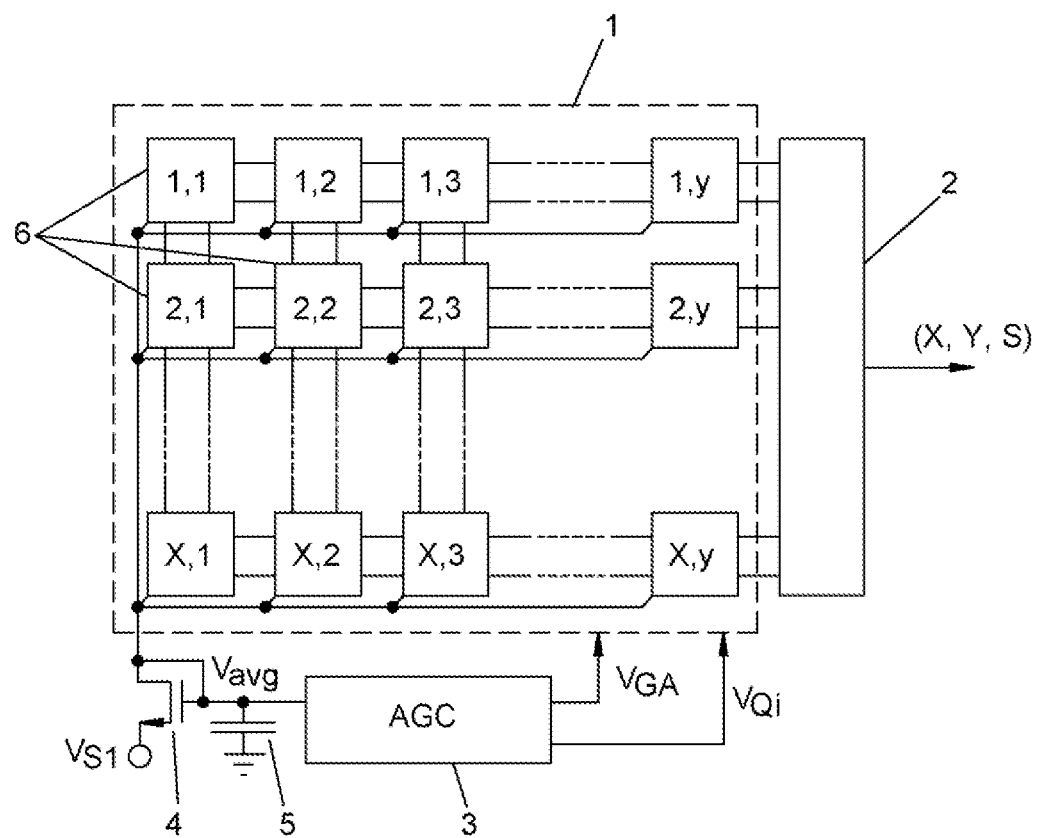
FIG. 2—shows an exemplary embodiment of the integrated circuit device for detecting temporal variation of the light intensity in a photosensor matrix object of the present invention.

In a first example of an embodiment of the device of the present invention, FIG. 2 shows an integrated circuit device for detecting temporal variation of the light intensity in a matrix of photosensors. Said device consists of a two dimensional matrix (1) (such matrix could also be one dimensional) of pixels which in turn consists of a plurality (x, y) of pixels (6), an arbitrating and event-encoding block (2), which also communicates events to the exterior of the apparatus connected to each and every one of the pixels (6), and a block for the automatic current gain adjustment AGC (3) connected to the matrix (1). Said connection between the matrix (1) and the AGC block (3) is performed by interposing a MOS transistor (4) and a capacitor connected to a voltage $V_{avg}$ setting a representation of the space-time average of the photocurrents generated in the matrix (1) of pixels, thus obtaining, at the output of the AGC block (3), the voltages $V_{GA}$ and $V_{Qi}$, wherein i varies from 1 to n and n is the total number of transimpedance amplification blocks used by the pixels (6).

Figure 3:
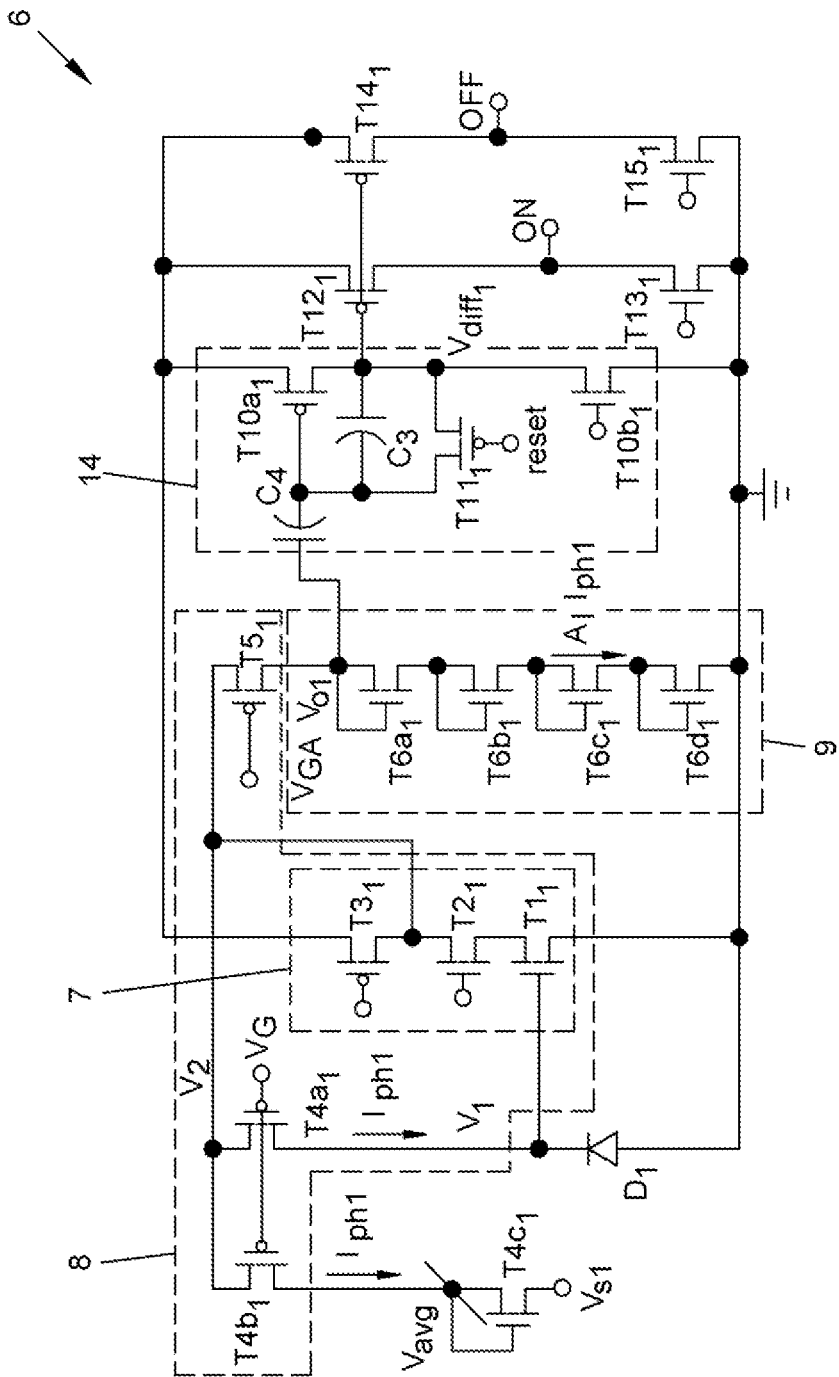
FIG. 3—shows a particular embodiment of the pixels making up the matrix of pixels of the sensor shown in FIG. 2.
Figure 4:
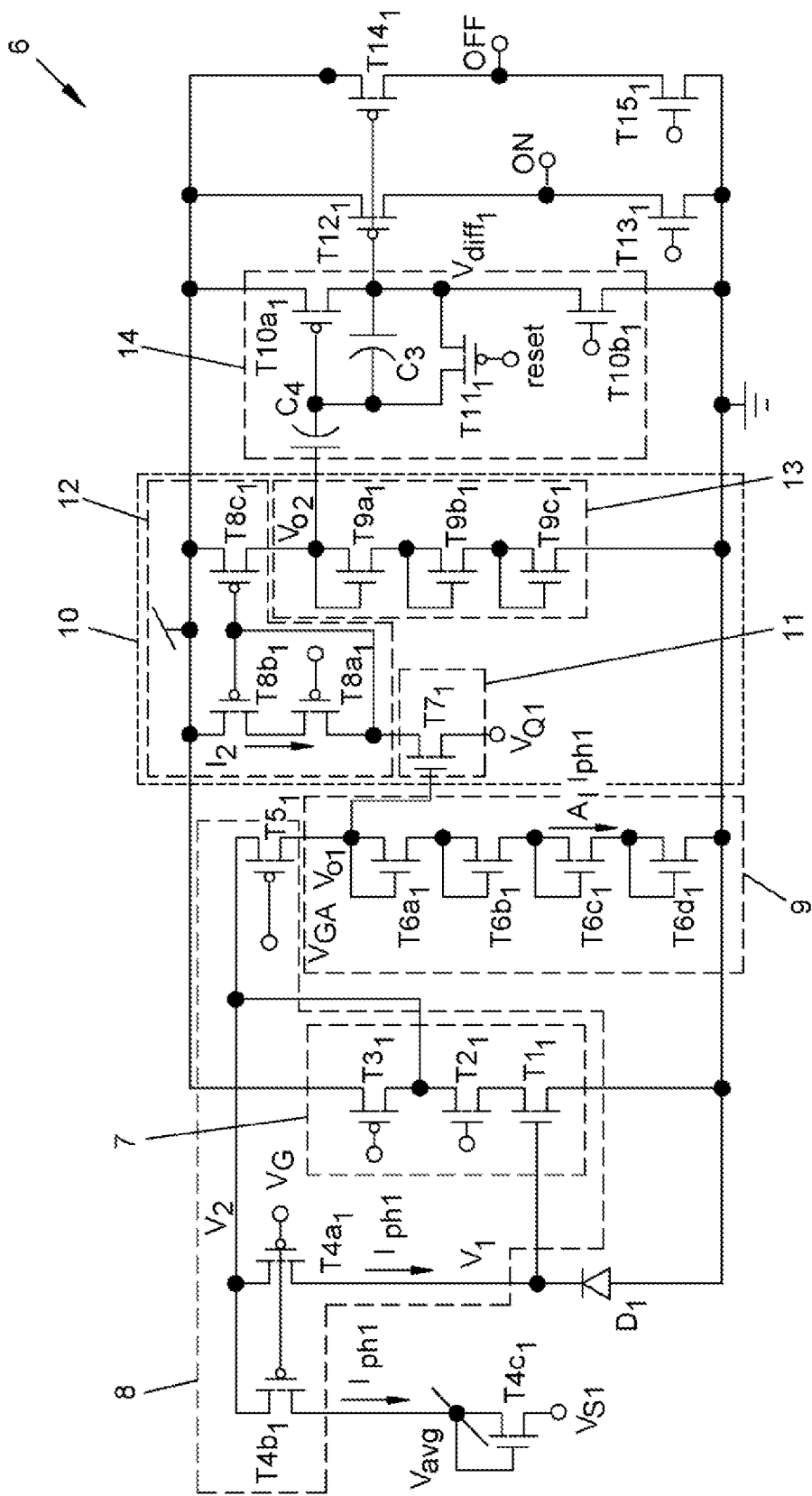
FIG. 4—shows another particular embodiment of the pixels making up the matrix of pixels of the sensor shown in FIG. 2, wherein said pixel has an additional amplification block.

FIGS. 3 and 4 show two particular embodiments of one pixel (6) forming the matrix of pixels (1) of FIG. 2. In both preferred embodiments, the pixel (6) comprises a photodiode $D_1$, two capacitors $C_3$ and $C_4$, and a series of labelled transistors Ti, where the index "i" takes the numerical values of 1 to 15, plus optionally letters a, b, c, or d. The photodiode $D_1$ provides a photocurrent $I_{ph1}$ proportional to the light striking the pixel (6). The transistors $T1_1$ to $T3_1$ provide a voltage amplifier (7) with input $V_1$ and output $V_2$, which is connected to the sources of the PMOS transistors $T4a_1$, $T4b_1$ and $T5_1$. This voltage amplifier (7) together with the transistor $T4a_1$ constitute the input branch of a current mirror (8) which receives the photocurrent $I_{ph1}$ as an input while it achieves the setting of the voltage $V_1$ at a constant value. The current mirror (8) has two output branches formed by the transistors T4$b_1$ and T5$_1$. The output branch formed by the transistor T4$b_1$ presents unity gain, as T4$b_1$ shares the gate voltage with the input branch transistor T4$a_1$ and transistors T4$a_1$ and T4$b_1$ are made with the same size. Optionally, such unity gain could be changed into a higher or lower one, either by changing the size ratios among T4$a_1$ and T4$a_2$, or by connecting them to different gate voltages, if considered convenient for design considerations. Without loss of generality, it has been herein considered that the gain is the unity. Therefore, T4$b_1$ provides a copy of the photocurrent I$_{ph1}$. This current is sent to the transistor T4$c_1$, which is connected in diode configuration between the nodes V$_{s1}$ and V$_{avg}$, both being shared by all the pixels of the matrix. Thus, in the shared node V$_{avg}$ a voltage, which depends on the photocurrent average of all the pixels, is formed. The transistor T5$_1$ forming the second output branch of the current mirror provides an amplified current A$_I$I$_{ph1}$, wherein the current amplification is determined by the difference between the gate voltages V$_G$ and V$_{GA}$. This voltage difference, which is common for all the pixels (6) as they all share these two voltages, is set by the automatic gain control block (3) described below. The so amplified photocurrent A$_I$I$_{ph1}$ is connected to a transimpedance amplifier formed by the transistors T6$a_1$ to T6$d_1$, each in diode configuration, and which must be polarized in weak inversion. The voltage V$_{o1}$ is the output voltage of the transimpedance stage and presents a value V$_{o1}$=N$_1$V$_o$ log (A$_I$I$_{ph1}$/I$_s$), wherein, in this particular example of a mode for carrying out the invention, the number of transistors in the transimpedance amplifier is N$_1$=4. In the mode for carrying out the invention shown in FIG. 3, this output voltage V$_{o1}$ is connected to the input of the switched capacitor stage (14) formed by the capacitors C3 and C4 and the transistors T10$a_1$, T10$b_1$ and T11$_1$.

The switched capacitor circuit (14) comprising the capacitors C3 and C4 and the transistors T10$a_1$, T10$b_1$ and T11$_1$, copies to V$_{diff1}$ the voltage variation at V$_{o1}$ from a previous reset time t$_1$, multiplied by the capacitive gain A$_{c1}$=C4/C3. Thus, V$_{diff1}$(t)=A$_{c1}$(V$_{o1}$(t)−V$_{o1}$(t$_1$))=A$_{c1}$N$_1$V$_o$ log (I$_{ph1}$(t)/I$_{ph1}$ (t$_1$)). Note that, in this expression, all parameters liable to undergo large dispersions from pixel to pixel have disappeared, remaining only the capacitive amplification A$_{c1}$, which presents low dispersion, the numbers N$_1$ with no dispersion and the physical parameter V$_o$ having low dispersion. The transistors T12$_1$ to T13$_1$ detect whether V$_{diff1}$ exceeds a specific positive threshold V$_{R+}$ and if so, it generates a positive event (ON). The transistors T14$_1$ to T15$_1$ detect whether V$_{diff1}$ drops below a negative threshold V$_{R-}$ and if so, they generate a negative event (OFF). Every time the pixel (6) generates an event, a reset of capacitor C3 occurs by means of the reset transistor T11$_1$. Thus, the pixel (6) generates a positive event at the time t$_2$ if V$_{R+}$=A$_{c1}$N$_1$V$_o$ log (I$_{ph1}$(t$_2$)/I$_{ph1}$(t$_1$)), and a negative event if V$_{R-}$=A$_{c1}$N$_1$V$_o$ log (I$_{ph1}$(t$_2$)/I$_{ph1}$(t$_1$)). This can also be expressed as ΔI/I=exp ((V$_{R+/-}$)/(A$_{c1}$N$_1$V$_o$))−1=θ−/−.

In the exemplary embodiment of the pixel shown in FIG. 4, it was chosen to add a second amplifier stage by adding one additional amplification block (10). This requires adding a transconductance stage (11), a current mirror (12) and a second transimpedance amplifier (13). The transconductance stage (11) constitutes the MOS transistor T7$_1$ polarized in weak inversion, which provides a current I$_2$=I$_s$ exp ((V$_{o1}$−V$_{Q1}$)/V$_o$). The current mirror (12) is made up, in this case and without loss of generality, of the transistors T8$a_1$ to T8$c_1$ and they copy the current I$_2$, which is present in the input branch, to the output branch. The gain or attenuation in this copy process is given by the relative proportion in the sizes of the transistors T8$b_1$ and T8$c_1$. Without loss of generality, it has been considered that transistors T8$b_1$ and T8$c_1$ are the same size, so that the gain of the mirror (12) will be the unity. Thus, the mirror (12) provides a current equal to I$_2$. This current enters in a second transimpedance stage (13) made up, in this case, of three transistors, namely T9$a_1$, T9$b_1$ and T9$c_1$, which provide an output voltage V$_{o2}$=N$_1$N$_2$V$_o$ log (A$_{ph1}$/I$_s$), wherein, in this particular exemplary embodiment, the number of transistors in the second transimpedance amplifier (13) is N$_2$=3. The additional amplification block (10) made up of the transistors T7$_1$, T8$i_1$, T9$j_1$, can be repeated as many times as needed and viable in order to increase the amplification factor in the final output voltage of the last transimpedance stage. This output is connected to the switched capacitor circuit (14). FIG. 4 shows an example in which the number of transimpedance amplifiers is n=2 because there is only one additional amplification block (10), and therefore the output of the last stage is V$_{o2}$. However, by placing more additional amplification blocks in cascade or iteration in the output of this first additional amplification block, where the last of these blocks is connected to the input of the switched capacitor circuit (14), an increase of the amplification factor is achieved in the final output voltage of the last transimpedance stage (13). Thus, in the output of the transimpedance stage (13) or the last additional amplification block (10), a voltage V$_{on}$ is obtained (n=number of additional amplification blocks positioned in cascade or iteration minus one, or n=number of transimpedance amplifiers). So in this case V=$_{diff1}$=A$_{C1}$ (V$_{o2}$(t)−V$_{o2}$(t$_1$))=A$_{c1}$N$_1$N$_2$V$_o$ log (I$_{ph1}$/I$_{ph1}$ (t$_1$)), and as in the previous way, the pixel generates a positive event in the time t$_2$ if V$_{R+}$=A$_{c1}$N$_1$N$_2$V$_o$ log (I$_{ph1}$ (t$_2$)/I$_{ph1}$ (t$_1$)), and a negative event if V$_{R-}$=A$_{c1}$N$_1$N$_2$V$_o$ log (I$_{ph1}$ (t$_2$)/I$_{ph1}$ (t$_1$)). In this way a sensitivity to the contrast θ$_{+/-}$=exp ((V$_{R+/-}$)/(A$_{c1}$N$_T$V$_o$))−1 is obtained, where N$_T$=N$_1$N$_2$. In one embodiment with n transimpedance amplifiers, it would be N$_T$=N$_1$N$_2$ . . . N$_n$.

Figure 1:
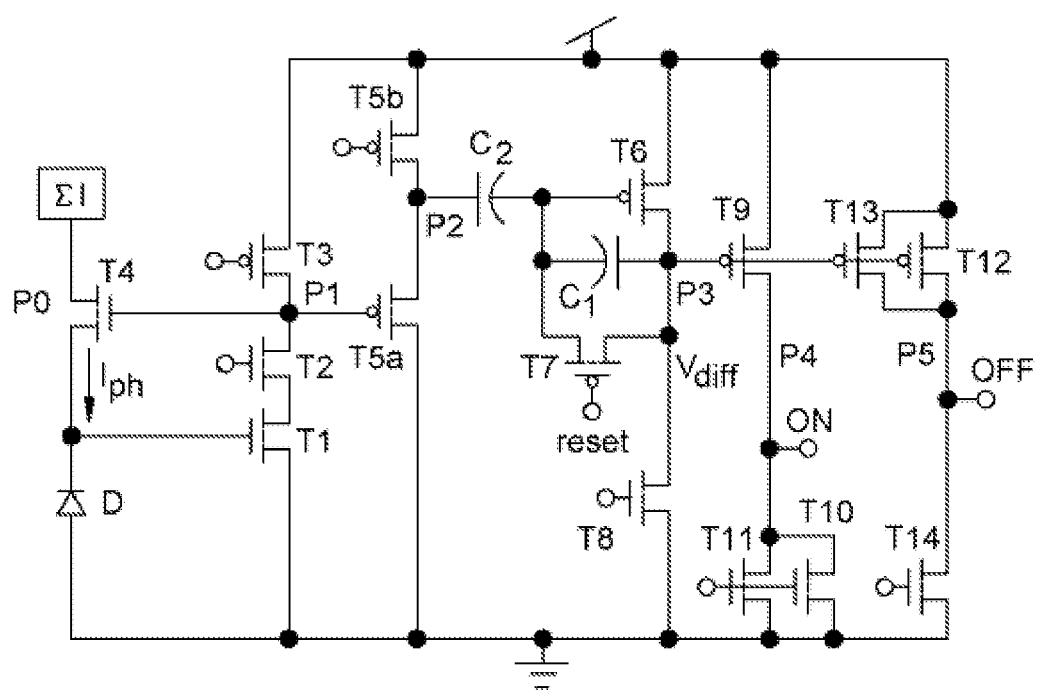
FIG. 1—shows an exemplary embodiment of the sensor of the photodiode matrix for detecting Lichtsteiner's time-dependent visual scenes described in U.S. Pat. No. 7,728,269 B2 and pertaining to the state of the art.

Therefore, if in FIG. 1 a ratio between C2 and C1 of value A$_c$=C2/C1=20 was adjusted, in the exemplary circuits in FIGS. 3 and 4 A$_{c1}$N$_1$N$_2$=24 can be achieved by making A$_{c1}$=2 (with N$_1$=4, N$_2$=3), which is achieved with the capacitors occupying very little area in an integrated circuit embodiment. In a typical embodiment, A$_{c1}$=5 would be set, which also translates into an insignificant area consumption within the pixel (6) while achieving a quite higher total gain A$_{c1}$N$_1$N$_2$=60, with consequent significant improvement of the contrast sensitivity, which, under these circumstances can be set at about 1%.

Figure 5:
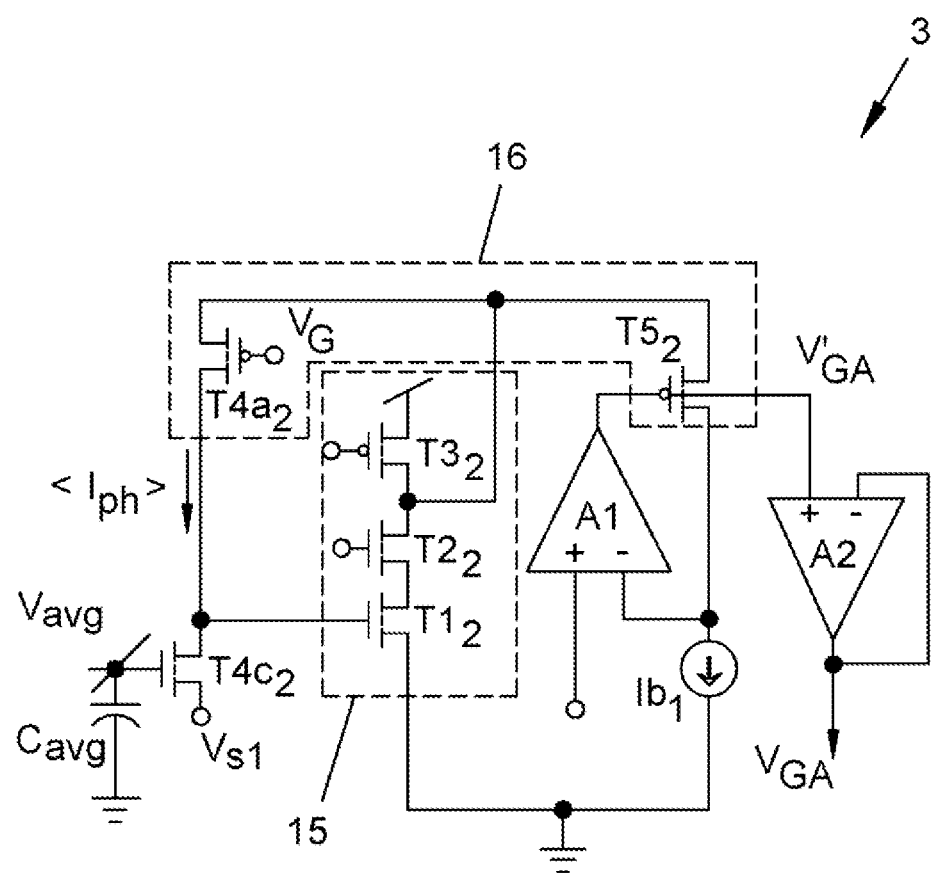
FIG. 5—shows an exemplary embodiment of the automatic gain control circuit of the sensor shown in FIG. 2.
Figure 6:
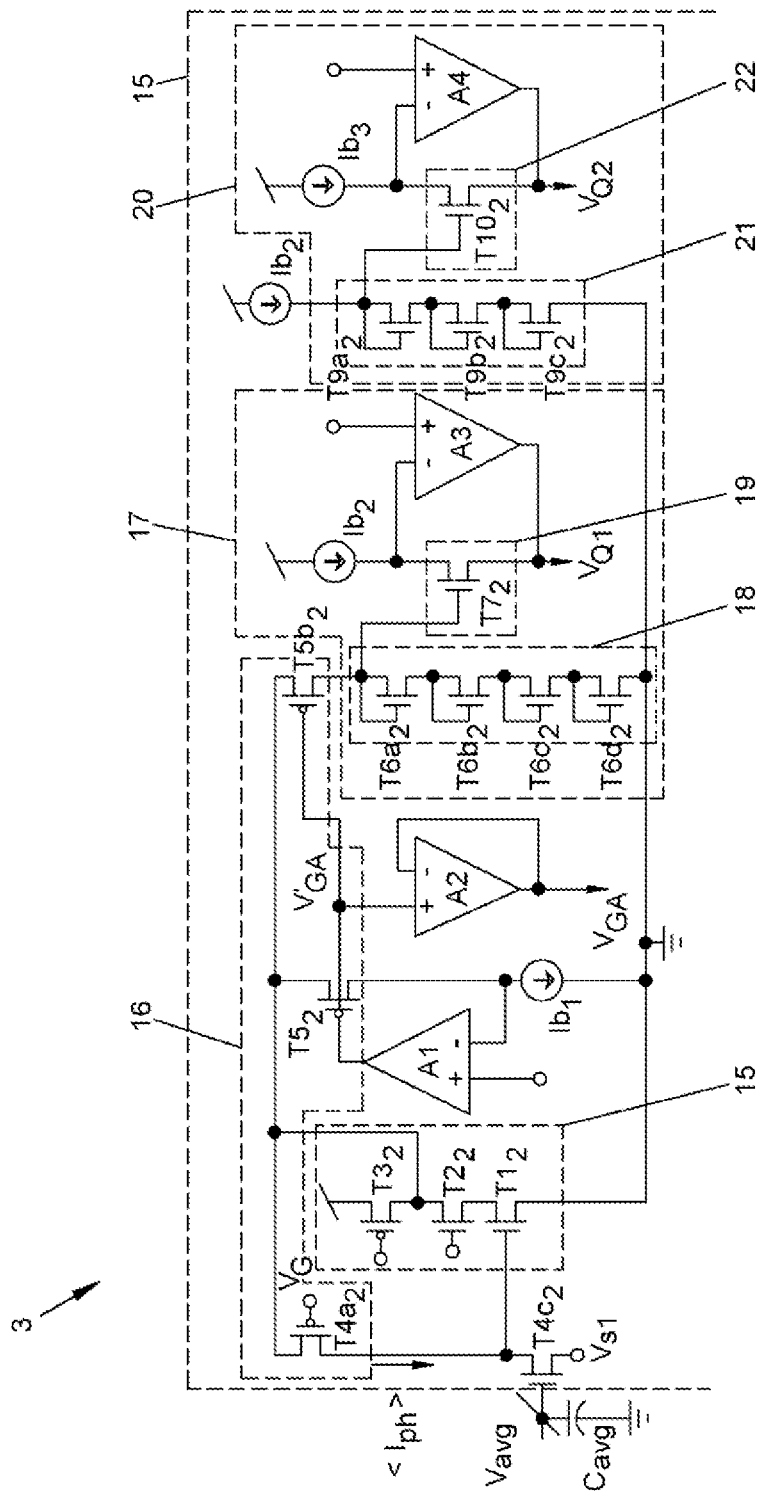
FIG. 6—shows an exemplary embodiment of the automatic gain control circuit of the sensor shown in FIG. 2, wherein said circuit has two additional adjusting stages.

On the outside of the two-dimensional matrix (1) of pixels shown in FIG. 2 there is an automatic gain control circuit (3), of which two exemplary embodiments are shown in FIGS. 5 and 6. This circuit shares, with all the pixels (6), the nodes referred to as V$_{avg}$, V$_G$, V$_{GA}$ and V$_{Qi}$, where i=1 to k, where k−1 is the number of additional amplification blocks (10) that have been included in the pixels (6), being in turn k=n−1. The node V$_{avg}$ is a representation of the spatial-temporal averaging <I$_{ph}$> of the photocurrent received by all photodiodes D$_1$ of the matrix of pixels (1). This voltage controls the gate of the transistor T4$c_2$, thus generating a current equal to the spatio-temporal average <I$_{ph}$>. Therefore, the transistor T4$c_2$ is acting as a photodiode that provides the average photocurrent <I$_{ph}$>. The transistors T1$_2$, T2$_2$ and T3$_2$ do the same function as T1$_1$, T2$_1$ and T3$_1$ in FIGS. 3 and 4 within each pixel, that is, they form a voltage amplifier (15). The transistors T4$a_2$ and T5$_2$ do the same function as T4$a_1$ and T5$_1$ within each pixel (6), that is, they form an adjustable gain current mirror (16), said gain depending on the difference of voltages V$_{GA}$'−V$_G$. The output of the current mirror (16) which corresponds to the MOS transistor T5$_2$ is sent to a source of current reference with a value I$_{b1}$. The differential voltage amplifier A1 is connected so that it compares the voltage in the output of the adjustable gain current mirror (16) with a voltage reference, and its output adjusts the gate of the output transistor T5$_2$ of the adjustable gain current mirror, i.e., it controls the voltage V$_{GA}$'. The result achieved with this amplifier A1 so connected is that the gain of the current mirror (16) formed by the transistors T4$a_2$ and T5$_2$, is self-adjusted, so that A$_1$<I$_{ph}$> equals I$_{b1}$. The gate voltage V$_{GA}$' so generated is copied to the gates of the transistors T5$_1$ of all pixels as the voltage V$_{GA}$ by means of the differential voltage amplifier set in unity gain A2. If the pixels contain a single transimpedance stage, i.e., if n=1, the automatic gain control circuit would end here (FIG. 5).

If the pixels contain a second transimpedance stage, i.e., an additional first amplification block (10), i.e., if n=2, then, the transistor T5$b_2$, which provides an additional copy of the output of the adjustable gain current mirror (16), providing a current A$_1$<I$_{ph}$>, and an additional first adjustment stage (17) should be added. This circuit would then comprise a transimpedance amplifier (18), a transconductance amplifier (19), a current reference I$_{b2}$ and a differential voltage amplifier A3. The current A$_1$<I$_{ph}$> is provided to the transimpedance amplifier (18) formed by the transistors T6$a_2$ to T6$d_2$, which are a replication of the transistors T6$a_1$ to T6$d_1$ in FIG. 3, which form the first transimpedance stage (9) in the pixels (6). The output of this transimpedance stage is connected to the transconductance amplifier (19) formed by the transistor T7$_2$, which is a replication of the transistor T7$_1$ in all pixels (6). The output of the transconductance amplifier (19) is connected to a current reference I$_{b2}$. This output is also connected to the input of a differential voltage amplifier, which compares it with a reference voltage and provides its output to the node V$_{Q1}$ of the transductance amplifier. The result of this configuration is that the voltage V$_{Q1}$ is self-adjusted so that the transductance amplifier (19) T7$_2$ provides the current I$_{b2}$. Since the voltage V$_{Q1}$ is shared with all pixels (6) of the matrix (1), it is achieved that the transconductance amplifiers (11) T7$_1$ of all pixels (6) operate at an average current equals to I$_{b2}$.

If the pixels comprise a third transimpedance stage, that is, an additional second amplification block (10) connected in cascade or iteration to the first one, i.e., if n=3, an additional second adjustment stage (20) should be added to the automatic gain control circuit (3). This exemplary embodiment is shown in FIG. 6. This would contain a replication of the second transimpedance stage (21) made up of the transistors T9$a_2$, T9$b_2$ and T9$c_2$ supplied by a current equal to the average of the corresponding current in the pixels (6). In this particular example, this current would be equal to I$_{b2}$, since the mirror formed by T8$a_1$ to T8$c_1$ in the pixels (6) is supposed to be of unity gain. If their gain were not unity, this current I$_{b2}$ should be multiplied by said gain. The transconductance amplifier (22) T10$_2$ and the amplifier A4 together with a current reference I$_{b3}$, which represents the value of the average current to which it is desired to make operate the third transconductance amplifier within the pixels, are also added. As in the additional first adjustment stage (17), in the additional second adjustment stage (20) a voltage V$_{Q2}$ is generated, which is shared with all pixels (6), so adjusting the average current of the second transconductance amplifier (13) in the pixels (6).

If the pixels (6) have more additional amplification blocks (10), more additional adjustment stages (20) arranged in cascade or iteration would be repeated in the automatic gain control circuit (3).

Figure 7:
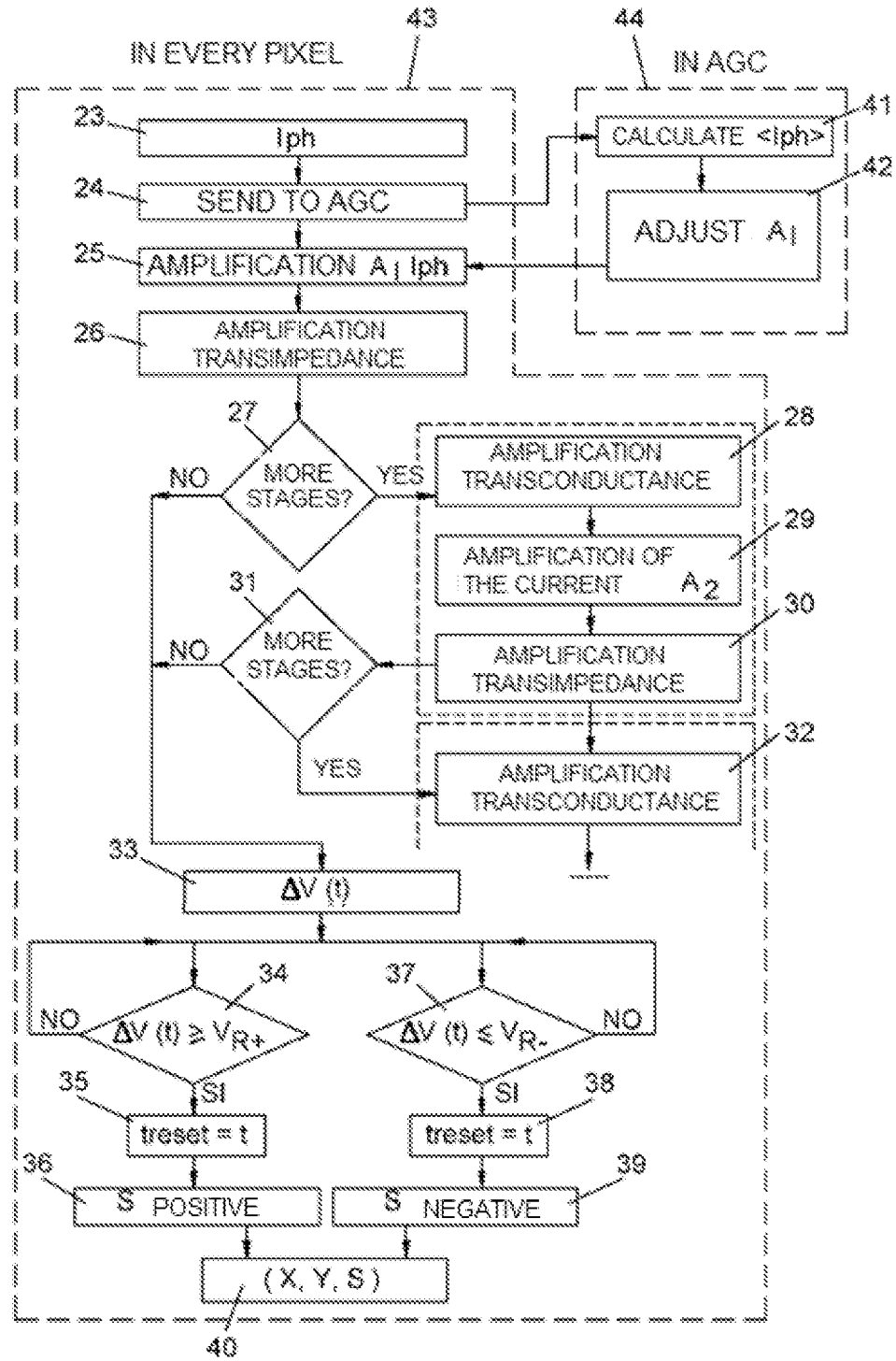
FIG. 7—shows the flowchart of a particular embodiment of the method object of the present invention using the device shown in FIG. 2.
Figure 8:
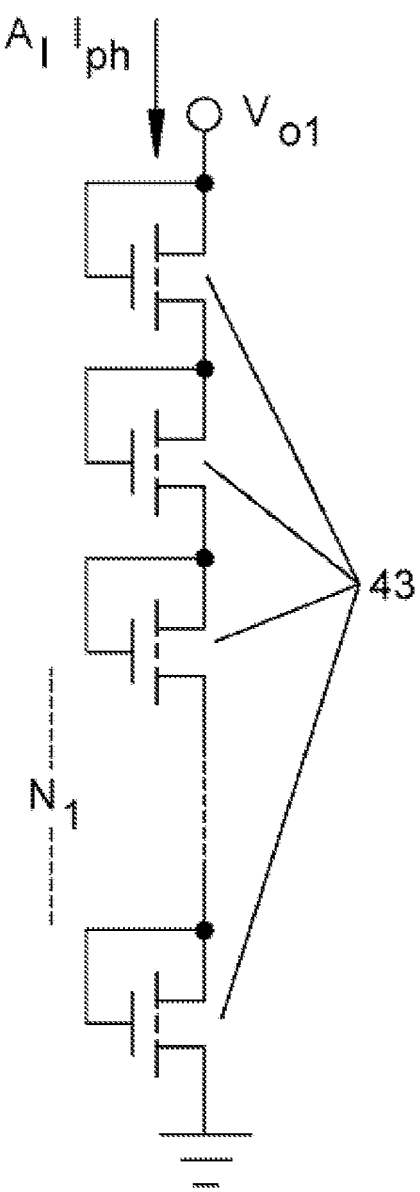
FIG. 8—shows a transimpedance amplifier with $N_1$ MOS transistors polarized in weak inversion, in diode configuration and connected in series of those used in the present invention. Such transistors are described in patent ES 201130862.

FIG. 7 shows an exemplary embodiment of the method object of the present invention. Said method is shown by a flow chart comprising two parts, a first part (45), which describes the sequence of stages to be performed within each pixel, and the second part (44), which describes the stages to be performed outside the matrix of pixels to perform the automatic adjustment of the current gain. Thus, firstly in each of the pixels, the integrated light sensor provides (23) a photocurrent I$_{ph}$, which is proportional to the light striking the pixel at each time. Next, a copy of the photocurrent is sent (24) to the block for the automatic gain adjustment (AGC). This photocurrent is amplified (25) thus becoming A$_I$I$_{ph}$, where the current gain A$_I$ is determined by the AGC itself. The resulting current A$_I$I$_{ph}$ is converted into a voltage (26) by a transimpedance amplifier (pertaining to the state of the art) of N$_1$ MOS transistors (43) polarised in weak inversion in diode configuration and connected in series, as shown in FIG. 8. Each MOS transistor in diode configuration generates a potential difference value V$_o$ log(A$_I$I$_{ph}$/I$_s$), wherein V$_o$ is a physical parameter that undergoes low dispersion from pixel to pixel, and I$_s$ is a technological parameter that undergoes a significant dispersion from pixel to pixel. Consequently, the output voltage of the transimpedance stage will be V$_{o1}$=N$_1$V$_o$ log (A$_I$I$_{ph}$/I$_s$).

Depending on each case, the voltage V$_{o1}$ obtained is evaluated (27) to decide whether it is sufficient or not, so that in the case that more amplification were not needed, the output voltage V$_{o1}$ will be used directly in the stage (33) shown below. If more amplification were required, the output voltage V$_{o1}$ is transformed (28) into a current I$_2$=I$_{o2}$ exp(V$_{o1}$/V$_o$) by means of a transconductance amplifier. Said current I$_2$ is copied (29) with an optional amplification or attenuation A$_2$, resulting in a current A$_2$I$_2$. If A$_2$=1, there is no amplification or attenuation. If A$_2$>1, there is amplification, and if A$_2$<1, there is attenuation. This gain/attenuation A$_2$ does not require automatic gain adjustment. The resulting current A$_2$I$_2$ is converted into a voltage (30) by a transimpedance amplifier of N$_2$ MOS transistors (43) polarised in weak inversion, in diode configuration, and connected in series, similarly as shown in FIG. 8. The output voltage of this transimpedance stage will be V$_{o2}$=N$_2$V$_0$ log(A$_2$I$_2$/I$_s$).

The stages (27-30) can be repeated again n−2 times, if the voltage V$_{o2}$ in the output were still not sufficient (31). In the end, the resulting output voltage will be V$_{on}$=N$_1$N$_2$ . . . N$_n$V$_o$ log (A$_1$A$_2$ . . . A$_n$I$_{ph}$/I$_s$). Subsequently, the difference between the resulting voltage output V$_{on}$ (t) and that in the immediately preceding reset time t$_{reset}$ is calculated (33). In this way, the value ΔV (t)=V$_{on}$(t)−V$_{on}$(t$_{reset}$)=N$_1$N$_2$ . . . N$_n$V$_o$ log(I$_{ph}$(t)/I$_{ph}$(t$_{reset}$)), is obtained, wherein the parameters with high dispersion A$_i$ and I$_s$ have disappeared. If in a given time ΔV (t) were higher than a pre-set positive voltage reference V$_{R+}$ (34) the next reset time is established, so updating t$_{reset}$=t (35), and the pixel outputs a positive event (36). If in a given time ΔV(t) drops below a pre-set negative voltage reference V$_{R-}$ (37), the next reset time is established, so updating t$_{reset}$=t (38), and the pixel outputs a negative event (39). Finally, for each event generated by each pixel, an event (40) is sent to the outside of the sensor formed by the coordinates (x, y) of the pixel that has generated the event as well as the sign s of the generated event.

As for the second part of the method, the average photocurrent <I$_{ph}$> (41) is calculated in the AGC by using the photocurrent copies provided by all pixels. Then, the quotient $A_I I_{b1}/\langle I_{ph}\rangle$ is calculated (42) where $I_{b1}$ is the average current level at which it is desired to make operate the first transimpedance amplifier, and this resulting value is the one used as the current amplification gain in all pixels, as described in the photocurrent amplification stage (25) in the AGC, which becomes $A_I I_{ph}$.

The invention claimed is:

1. A device for detecting temporal variation of the light intensity in a matrix of photosensors, characterised in that it comprises at least:
   a matrix of pixels, wherein each pixel comprises at least:
   a) a photosensor which generates a photocurrent proportional to a light striking its surface;
   b) an adjustable gain current mirror (8) comprising an input branch, a first output branch with adjustable current gain and a second output branch with a fixed gain, which copy the input photocurrent to respective outputs and where the output branch with fixed gain is connected to a collector transistor ($T4c_1$) connected in diode configuration and whose nodes are connected to the collector transistors of the other pixels of the matrix;
   c) a transimpedance amplifier ($T6a_1$-$T6d_1$) arranged in the output of the adjustable gain current mirror, the amplifier comprising at least two MOS transistors polarised in weak inversion and arranged in series, each MOS transistor being in diode configuration, for the conversion of the photocurrent into a logarithmic voltage;
   d) a switched capacitor circuit (14) comprising a first capacitor (C4) connected to the output of the transimpedance amplifier ($T6a_1$-$T6d_1$), a voltage amplifier ($T10a_1$-$T10b_1$) connected to the first capacitor (C4), and a second capacitor (C3) connected in series to the first capacitor (C4) and feedback connected to the voltage amplifier, the second capacitor being connected in parallel to a MOS transistor ($T11_1$) which acts as a reset key; and,
   e) a first threshold detector to determine if the voltage exceeds a higher threshold and a second threshold detector to determine if the voltage drops below a lower threshold, both detectors being connected to the output of the second voltage amplifier ($T10a_1$-$T10b_1$) and said higher and lower thresholds being previously set by a user,
   a block for the automatic adjustment of the amplification of the photocurrent, which calculates the average of the photocurrents of the pixels of the matrix; and,
   an arbitrating and event-encoding block connected to the output of the pixel matrix.

2. The device for detecting temporal variation of the light intensity according to claim 1, characterised in that the transimpedance amplifier ($T6a_1$-$T6d_1$) is connected to switched capacitor circuit (14) by interposing at least one additional amplification block (10), the amplification blocks (10) being connected in cascade or iteration, wherein the input of the first additional amplification block (10) is connected to the output of the first transimpedance amplifier ($T6a_1$-$T6d_1$) and the output of the last additional amplification block (10) is connected to the first capacitor (C4) of the switched capacitor circuit (14), wherein each block comprises at least one transconductance amplifier (11), a fixed gain current mirror (12) connected to the output of the transconductance amplifier (11) and an additional transimpedance amplifier ($T9a_1$-$T9c_1$) with at least two additional MOS transistors polarised in weak inversion and connected in diode configuration, the second transimpedance amplifier being connected to the output of the fixed gain current mirror.

3. The device for detecting temporal variation of the light intensity, according to claim 2, characterised in that when there is more than one additional amplification block (10), the blocks (10) are connected in cascade or iteration one to the other, by connecting the gate terminal of the transconductance amplifier (11) of each block with the output of the additional transimpedance amplifier ($T9a_1$-$T9c_1$) of the previous block.

4. The device for detecting temporal variation of the light intensity, according to claim 3, characterised in that the adjustable gain current mirror is formed by at least one MOS input transistor ($T4a_1$), one MOS output transistor ($T5_1$) and a voltage inversion amplifier ($T1_1$-$T3_1$).

5. The device for detecting temporal variation of the light intensity, according to claim 2, characterised in that the adjustable gain current mirror is formed by at least one MOS input transistor ($T4a_1$), one MOS output transistor ($T5_1$) and a voltage inversion amplifier ($T1_1$-$T3_1$).

6. A method for detecting the temporal variation of the light intensity in a matrix of photosensors, which uses the device described in claim 2, characterised in that in each pixel of the matrix, the following stages are carried out:
   1) transforming the light striking the pixel in a current $I_{ph}$ by means of the photodiode;
   2) amplifying the current $I_{ph}$ to a value $A_I I_{ph}$ by means of the adjustable gain current mirror;
   3) adapting the value $A_I$ so that the average $A_I I_{ph}$ remains constant against the temporal variations of the average brightness of all the pixels by means of the automatic amplification block of the photocurrent, which adjusts the amplification in stage 2;
   4) converting the current $A_I I_{ph}$ adapted to a voltage by means of the transimpedance amplifier ($T6a_1$-$T6d_1$), which comprises a plurality of MOS transistors polarised in weak inversion and connected in series, each of them being connected in diode configuration;
   5) determining in the switched capacitor circuit a voltage difference $\Delta V=V(t_2)-V(t_1)$ between two consecutive times $t_1$ and $t_2$, caused by a temporal variation of the light intensity and comparing the voltage difference with a fixed positive reference value $V_{R+}$ and a fixed negative reference value $V_{R-}$, being $V_{R+}$ and $V_{R-}$ the same for all pixels of the matrix;
   6) generating the digital signal s which is sent to the arbitrating and event-encoding block, the signal being selected among:
      a positive event every time the first threshold detector determines that the voltage exceeds the higher threshold, generated in the first threshold detector; and,
      a negative event every time the second threshold detector determines that the voltage drops below the lower threshold, generated in the second threshold detector;
   and; in the arbitrating and event-encoding block connected to the output of the pixel matrix the following stages are carried out:
      identifying the spatial coordinates (x,y) of the pixels of the matrix which have generated a digital signal,
      sending to an external device an event containing the spatial coordinates (x,y) and the signal s; and,
      generating a flow of events (x,y,s) representing the temporal variation of the light intensity on the matrix of photosensors.

7. The device for detecting temporal variation of the light intensity, according to claim 1, characterised in that the adjustable gain current mirror is formed by at least one MOS input transistor ($T4a_1$), one MOS output transistor ($T5_1$) and a voltage inversion amplifier ($T1_1$-$T3_1$).

8. The device for detecting temporal variation of the light intensity according to claim 7, characterised in that in the MOS input transistor ($T4a_1$) of the adjustable gain current mirror has:
  its gate terminal connected to a voltage VG previously set by a user from outside the device;
  its drain terminal connected to the photosensor; and,
  its source terminal connected to the output of the voltage inversion amplifier ($T1_1$-$T3_1$).

9. The device for detecting temporal variation of the light intensity according to claim 8, characterised in that the MOS output transistor ($T5_1$) of the adjustable gain current mirror has:
  its source terminal connected to the source terminal of the MOS input transistor ($T4a_1$);
  its gate terminal connected to a voltage $V_{GA}$ which is set by the automatic gain control circuit AGC; and,
  its drain terminal connected to the input of the first transimpedance amplifier ($T6a_1$-$T6d_1$).

10. The device for detecting temporal variation of the light intensity according to claim 7, characterised in that the MOS output transistor ($T5_1$) of thea adjustable gain current mirror has:
  its source terminal connected to the source terminal of the MOS input transistor ($T4a_1$);
  its gate terminal connected to a voltage $V_{GA}$ which is set by the automatic gain control circuit AGC; and,
  its drain terminal connected to the input of the first transimpedance amplifier ($T6a_1$-$T6d_1$).

11. The device for detecting temporal variation of the light intensity, according to claim 1, characterised in that the arbitrating and event-encoding block comprises a processor for, when the first threshold detector determines that the voltage has exceeded the higher threshold or when the second threshold detector determines that the voltage has dropped below the lower threshold, determining x and y coordinates corresponding to a pixel position in the matrix and generating an event with sign s, the sign s being determined by the first and second threshold detector, generating a word which binary-encodes the set formed by the coordinates (x,y) and the sign s.

12. The device for detecting temporal variation of the light intensity, according to claim 1, characterised in that the block for the automatic adjustment of the amplification of the photocurrent is an automatic gain control circuit AGC comprising at least:
  a) a replication of the collector transistor of the pixels ($T4_{C2}$);
  b) a replication of the adjustable gain current mirror of the pixel in which the gate terminal of the MOS input transistor ($T4a_2$) is connected to a voltage $V_G$, its MOS output transistor ($T5_2$) to a voltage $V_{GA}'$; and its output is connected to a first current reference $I_{b1}$;
  c) a first differential voltage amplifier (A1) whose negative input is connected to the output of the mirror, whose positive input is connected to a voltage reference and whose output is connected to the output gate of the MOS transistor ($T5_2$), generating the voltage $V_{GA}'$; and,
  d) a second differential voltage amplifier (A2), connected in unity gain configuration, which copies the voltage $V_{GA}'$ to the gate terminals of the output transistors ($T5_1$) of the adjustable gain current mirrors (8) of the pixels whose voltage is $V_{GA}$.

13. The device for detecting temporal variation of the light intensity according to claim 12, characterised in that the block for the automatic adjustment of the amplification of the photocurrent comprises a second MOS output transistor ($T5b_2$) of the adjustable gain mirror that shares the gate and source terminals of the first MOS output transistor ($T5_2$), and whose drain terminal constitutes a second output from the mirror and an additional adjustment stage for each additional amplification block (10) of the pixel, where each additional adjustment stage comprises:
  a transimpedance amplifier ($T6a_2$-$T6d_2$) which is a replication of the first transimpedance amplifier in the pixels ($T6a_1$-$T6d_1$) whose input is connected to the output of the MOS output transistor ($T5b_2$), thus generating a logarithmic voltage in the amplifier ($T6a_2$ $T6d_2$);
  a transconductance amplifier ($T7_2$) which is a replication of the transconductance amplifier (11) in the additional amplification block (10) in the pixels ($T7_1$), whose gate is connected to the output of the MOS output transistor ($T5b_2$), its source is at a voltage $V_{Q1}$ which is common to all pixels, and whose drain is connected to a current reference $I_{b2}$; and,
  a third differential voltage amplifier (A3) whose negative input is connected to the second current reference $I_{b2}$, whose positive input is connected to a voltage reference and whose output is connected to the node $V_{Q1}$.

14. The device for detecting temporal variation of the light intensity, according to claim 13, characterised in that the block for the automatic adjustment of the amplification of the photocurrent comprises an additional stage of adjustment for each block of additional adjustment of the pixel, each stage of additional adjustment being connected in cascade or iteration to the previous stage of additional adjustment.

15. The device for detecting temporal variation of the light intensity, according to claim 12, characterised in that the block for the automatic adjustment of the amplification of the photocurrent comprises an additional stage of adjustment for each block of additional adjustment of the pixel, each stage of additional adjustment being connected in cascade or iteration to the previous stage of additional adjustment.

16. A method for detecting the temporal variation of the light intensity in a matrix of photosensors, which uses the device described in claim 1, characterised in that in each pixel of the matrix, the following stages are carried out:
  1) transforming the light striking the pixel in a current $I_{ph}$ by means of the photodiode;
  2) amplifying the current $I_{ph}$ to a value $A_I I_{ph}$ by means of the adjustable gain current mirror;
  3) adapting the value $A_I$ so that the average $A_I I_{ph}$ remains constant against the temporal variations of the average brightness of all the pixels by means of the automatic amplification block of the photocurrent, which adjusts the amplification in stage 2;
  4) converting the current $A_I I_{ph}$ adapted to a voltage by means of the transimpedance amplifier ($T6a_1$-$T6d_1$), which comprises a plurality of MOS transistors polarised in weak inversion and connected in series, each of them being connected in diode configuration;
  5) determining in the switched capacitor circuit a voltage difference $\Delta V = V(t_2) - V(t_1)$ between two consecutive times $t_1$ and $t_2$, caused by a temporal variation of the light intensity and comparing the voltage difference with a fixed positive reference value $V_{R+}$ and a fixed negative reference value $V_{R-}$, being $V_{R+}$ and $V_{R-}$ the same for all pixels of the matrix;

6) generating the digital signal s which is sent to the arbitrating and event-encoding block, the signal being selected among:

a positive event every time the first threshold detector determines that the voltage exceeds the higher threshold, generated in the first threshold detector; and, a negative event every time the second threshold detector determines that the voltage drops below the lower threshold, generated in the second threshold detector;

and; in the arbitrating and event-encoding block connected to the output of the pixel matrix the following stages are carried out:

identifying the spatial coordinates (x,y) of the pixels of the matrix which have generated a digital signal, sending to an external device an event containing the spatial coordinates (x,y) and the signal s; and, generating a flow of events (x,y,s) representing the temporal variation of the light intensity on the matrix of photosensors.

17. The method for detecting the temporal variation of the light intensity according to claim 16, characterised in that a difference is calculated in the voltage between two reset consecutive times by the switched capacitor circuit.

18. The method for detecting the temporal variation of the light intensity according to claim 17, characterised in that, after converting the current $A_I I_{ph}$ adapted to a voltage and as a stage previous to determining in the switched capacitor circuit a voltage difference $\Delta V = V(t_2) - V(t_1)$, it comprises amplifying the voltage from the current conversion $A_I I_{ph}$ by means of at least one additional amplification block (10).

19. The method for detecting the temporal variation of the light intensity according to claim 16, characterised in that, after converting the current $A_I I_{ph}$ adapted to a voltage and as a stage previous to determining in the switched capacitor circuit a voltage difference $\Delta V = V(t_2) - V(t_1)$, it comprises amplifying the voltage from the current conversion $A_I I_{ph}$ by means of at least one additional amplification block (10).

* * * * *